United States Patent Office 3,083,625
Patented Apr. 2, 1963

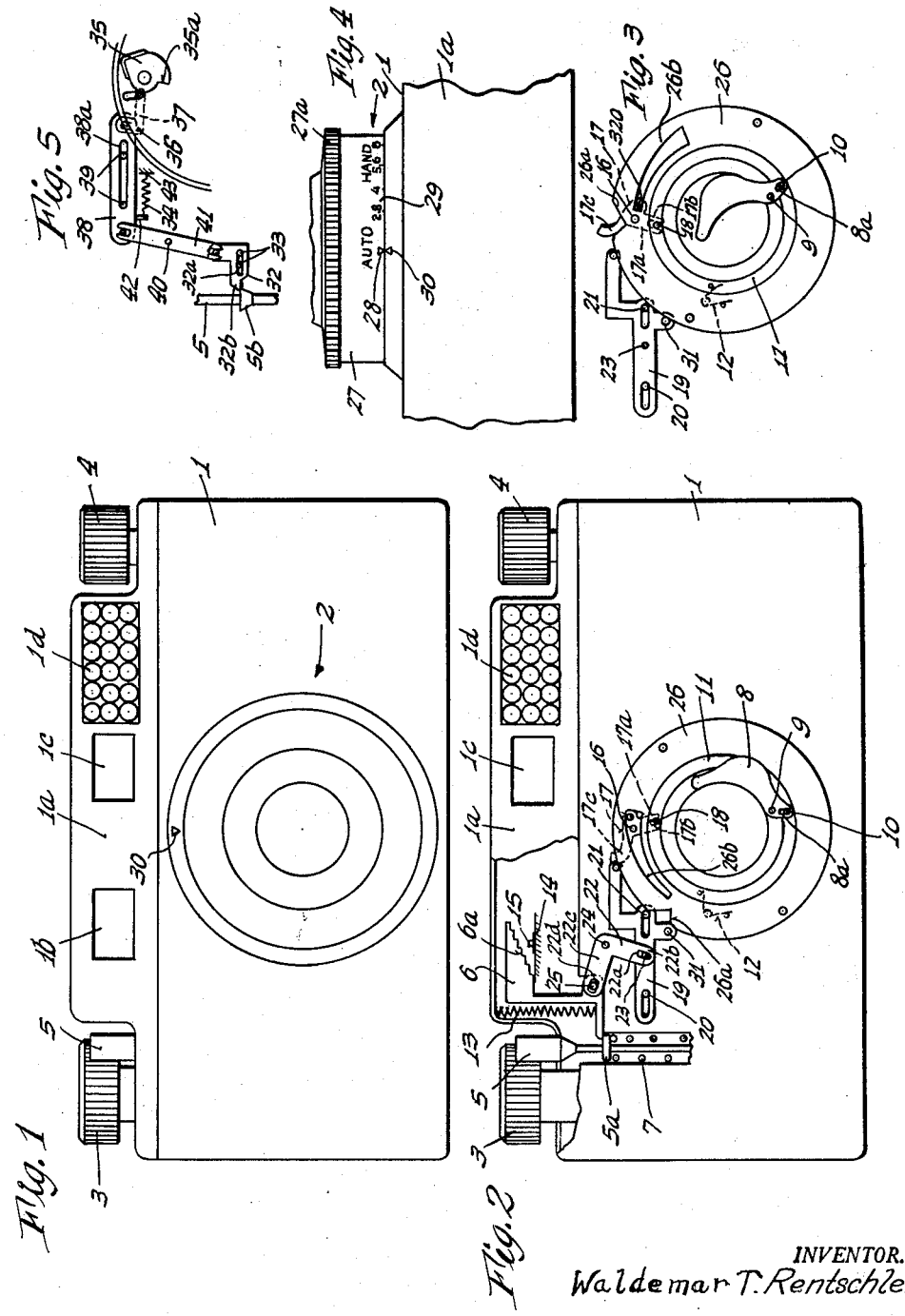

3,083,625
PHOTOGRAPHIC CAMERA HAVING AUTOMATIC DIAPHRAGM SETTING
Waldemar T. Rentschler, Calmbach (Enz), Germany, assignor to Alfred Gauthier G.m.b.H., Calmbach (Enz), Germany, a corporation of Germany
Filed Mar. 14, 1960, Ser. No. 14,691
Claims priority, application Germany Mar. 14, 1959
9 Claims. (Cl. 95—10)

This invention relates to photographic cameras of the type which have automatic diaphragm setting means, such means including a sensing or follower device which is connected to an operating member of the camera diaphragm, and which is arranged to follow or sense, in response to the operation of the camera or shutter release, the position of a deflectable member constituting a part of the measuring mechanism of an electric exposure meter, which latter is built into or carried by the camera case.

Various types of photographic cameras of the above type have been proposed and constructed in the past. Because of the construction involved, the diaphragm devices which are used in these cameras need for their movement a comparatively great force, and have a path of movement which is substantially greater than the adjusting path of movement of the sensing device which cooperates with the movable or deflectable member of the measuring mechanism of the exposure meter. This makes it necessary to include in the connection between the sensing device and the diaphragm actuating member a transmission means which is costly at best, in order to accommodate the extents of movement of the diaphragm adjusting member and the cooperable member of the sensing device. Furthermore, in order to insure a reliable operation of the camera it is necessary to use comparatively strong or powerful adjusting forces in connection with the sensing device. The restoring force for the camera or shutter release, which is required to overcome the said adjusting force when sensing device is to be returned to its starting position after release of the camera or shutter release means, is therefore of such magnitude that the camera has a decidedly "hard" release operation, which increases the risk of spoiling the picture by moving the camera.

The above disadvantage of cameras of the aforementioned kind is obviated by the present invention, and accordingly one object of the invention is to provide an improved automatically-setting type camera wherein the actuation of the camera or shutter release may be carried out with the expenditure of but little force, while at the same time the involved structures are simple and economical to manufacture.

This is accomplished essentially by the provision of a novel combination structure which is characterized by a diaphragm assemblage constituted of a plurality of separate shutter blade like segments or lamellas.

Diaphragm assemblages of this type are characterized by a relatively small path or extent of movement of the movable pieces or lamellas, and by an operation which requires only relatively small operating forces. These characteristics of a segment or lamella-type diaphragm enable a camera to be constructed in accordance with the invention, wherein the extent of movement of the diaphragm actuator and of the sensing device which cooperates with the deflection member may be approximately equal, making it unnecessary to incorporate costly transmissions in the connection between the sensing device and the diaphragm actuating member. In addition, a connection which is devoid of such transmission, together with the ease of movement or adjustment of the diaphragm, make possible complete adjustment of the diaphragm over its entire range by the sensing device with only relatively small force being required, thereby enabling the camera to have a "soft" release operation.

According to a further construction as provided by the invention, an additional field of use can be realized for such a camera by the provision of a selector device which is settable in automatic and manual or hand positions, and which enables the automatic setting device to be rendered inoperative at will, whereby adjustment of the diaphragm may be carried out manually.

This organization makes it possible to use the camera, as provided by the invention, for the taking of photographs wherein the light conditions will differ before and during the exposure. This is, for example, the case with flash exposures.

An easy to operate and readily understandable manual setting of the diaphragm may be further had by effecting a uni-directionally positive, tensional connection between a cam which is connected to and actuated by the selector device and the diaphragm segments.

An especially compact and simple structure involving the diaphragm organization, which is adaptable to existing structures of well-known cameras, is obtained by arranging for the operation of the diaphragm segments by a ring which is concentric with respect to the optical axis, and by constituting the selector device and the manually operable diaphragm setting member as a ring which is also concentric with respect to the optical axis.

An advantageous construction which enables a minimum number of parts to be employed, is obtained by the provision of a two-armed lever which constitutes the connection between the cam which is provided on the selector and manually operable setting member, and the diaphragm-actuating ring, and by arranging such lever so that it constitutes the connection between the diaphragm-actuating ring and the sensing device when the selector is set at "automatic."

In order to obtain an orderly method of operating the camera when photographs are to be taken with an automatic diaphragm setting, provision is made for retaining the diaphragm in its adjusted position as determined by the deflectable member of the measuring mechanism of the electric exposure meter, until the camera shutter recloses after having been released. This is accomplished in an uncomplicated manner by the provision of a locking device, by means of which the camera or shutter release is retained in the released position after having been actuated or shifted thereto, until the camera shutter again recloses upon completion of the exposure.

Such locking device can be released or rendered inoperative reliably and automatically, without requiring additional operations or manipulations, by means of a member of the shutter drive mechanism, as, for example, by means of the main drive member of the shutter drive.

An embodiment of the invention is illustrated in the accompanying drawing, in which:

FIG. 1 is a diagrammatic front elevational view of a photographic camera as provided by the invention, utilizing the improved diaphragm setting mechanism.

FIG. 2 is also a front view of the camera, showing diagrammatically the diaphragm and diaphragm adjusting or setting mechanisms. The selector device is in the "automatic" position, wherein the automatic setting mechanism is rendered operative.

FIG. 3 is a fragmentary front elevational view illustrating the diaphragm and selector mechanisms, with the latter set for manual adjustment of the diaphragm.

FIG. 4 is a fragmentary top plan view of a camera of the type shown in FIGS. 1 and 2, illustrating the selector and manually operable diaphragm setting ring.

FIG. 5 is a diagrammatic representation of a locking device controlled by the main drive member of the camera shutter, for retaining the camera release or shutter release in its released position until the exposure has been completed.

Referring now to FIGS. 1, 2 and 4, the housing or case of the camera is indicated by the numeral 1. Mounted on the front of the case 1 is a photographic intra-lens shutter assemblage 2 having a built-in diaphragm, in a well-known manner. Operating knobs 3 and 4 of the film transport and film rewinding devices are provided on the upper wall of the housing or case 1, as well as a shutter release member 5 which is movable vertically and disposed in a plane located at right angles to the optical axis. A coil spring 7, provided in the upper portion of the camera case 1, normally holds the shutter release member 5 in the raised position shown, in a well-known manner. For the purpose of automatically setting the diaphragm, there is provided a sensing means including a powered movable member 6 which is connected with an actuating or adjusting member of the diaphragm assemblage, said sensing device enabling the position of a deflectable member of the measuring mechanism of an electric exposure meter to be followed or sensed in a well-known manner in response to actuation of the shutter release 5, as described in detail below. The electric exposure meter may be built into the camera case 1 or mounted thereon in any suitable manner. As shown, the exposure meter is held in an upper portion of the camera case under a cover plate 1a. The cover plate 1a has windows 1b and 1c for a telemeter finder or combined view finder and distance meter, the said finder being coupled with the objective of the camera, as is well undertsood. The cover plate 1a also has a honeycomb window 1d to accommodate a photoelectric cell of the exposure meter.

In accordance with the present invention the diaphragm mechanism is constituted as a sector diaphragm having a plurality of segments or lamellas.

Due to the small extent of movement of the diaphragm adjusting member which is required to regulate the diaphragm opening or aperture, the use of such a diaphragm in the camera of the present invention has the special advantage that the connection between the powered sensing member 6 and the diaphragm adjusting member can be directly effected, without the intermediary of transmissions. This produces, on the one hand, an extremely simple, space-saving structure involving but few components, whereas, on the other hand, there is required only a comparatively small force in order to carry out the sensing movement or operation of the sensing member and means, for the purpose of effecting adjustment of the diaphragm. By virtue of this, the restoring force which is required by the sensing means to reset the latter, and which must be supplied by the shutter release, may be relatively small, thereby resulting in a "soft" release operation of the camera as provided by the invention. Such restoring force is provided by the shutter release return spring 7, as shown in the illustrated embodiment of the invention, and accordingly such spring need not be especially stiff or powerful.

The diaphragm segments, which are constituted as sectors, are pivotally positioned about stationary bearing axles or pins 9. Only one diaphragm sector is illustrated, for the sake of clarity of illustration. However, it will be understood that a number of such sectors are involved in the diaphragm construction. The diaphragm sectors, indicated at 8, have pin-and-slot connections 8a, 10 with a turnable actuating ring 11, which latter is biased in a clockwise direction, making for a diaphragm aperture of maximum size, by a light spring 12.

The powered member 6 of the sensing device, which may for example be constituted as a hollow cylinder having a bearing in a stationary portion or member of the measuring mechanism or movement of the exposure meter, is vertically movable and is acted on by a helical compression spring 13, which tends to maintain the member in abutting engagement with a collar or flange 5a provided on the shutter release 5. The spring 13 is weaker than the spring 7, whereby it may be readily overcome by the latter.

In order to cooperate with the deflectable member of the measuring mechanism of the exposure meter, the powered sensing member 6 is constituted with a stepped setting edge 6a which is engageable, upon actuation of the shutter release 5, under the action of the spring 13 with the deflection member or needle 15 of the measuring mechanism or instrument movement. The needle 15 is shown as being shiftable horizontally (as seen in FIG. 2) over a stationary stop or backing surface 14. The adjusted or deflected position of the needle 15, and hence the extent of movement which is permitted the powered sensing member 6, is a measure of the intensity of the existing light conditions during the automatic diaphragm setting operation. Also, the extent of such movement and the position of the deflectable needle 15 may depend on other exposure-influencing factors apart from the diaphragm aperture, such as the factors of shutter speed, film sensitvity, and light filtration. These other factors may be taken into consideration during the setting of the movable deflectable needle 15 in any manner known per se, as for example by effecting a rotational adjustment of the measuring mechanism or instrument movement, which is commonly of the galvanometer type.

Details of such electric exposure meter and adjustable measuring device are not given herein since per se they do not constitute the invention. Such details may be found in copending application Serial No. 859,734 filed December 15, 1959 and entitled Photographic Camera With Automatic Exposure Regulator, now Patent No. 3,018,706.

A two-armed lever 17 pivotally positioned about a stationary axle or pin 16 serves, in the illustrated embodiment of the invention, to connect the powered sensing member 6 to the diaphragm-actuating ring 11. One arm 17a of the lever 17 has a pin-and-slot connection 17b, 18 with the diaphragm-actuating ring 11, whereas the other lever arm 17c engages a displaceable member 19 under the action of the diaphragm biasing spring 12 which acts on the diaphragm-adjusting ring 11. The member 19 is in the form of a slide, which is movably mounted in the camera by means of pins 20 and 21 passing through slots as shown. The slide 19 has a pin-and-slot connection 22a, 23 with one arm 22b of a bell crank 22 which is pivotally mounted about a pin 24 affixed to the camera. The other arm 22c of the bell crank 22 has a pin-and-slot connection 22d, 25 with the powered sensing member 6.

The use of a transmisison device of the above-described kind between the powered sensing member 6 and the diaphragm adjusting ring 11 provides in the simplest possible manner, for the adaptability of the diaphragm setting device to the existing structures of the camera. However, insertion of such a transmission device, which has a gear ratio of approximately 1:1, is not an absolute "must" in a camera as constituted by the invention. It is equally possible to effect a direct connection between the members 6 and 11, depending on the particular structure of the camera.

In obtaining the greatest possible versatility of a camera as provided by the invention, it is advantageous to provide for setting of the diaphragm by manual means, as well as by the above-described automatic setting device.

This is accomplished, in accordance with a further construction as provided by the invention, by a selector means or device which can be placed in either an "automatic" position or else a "hand" or manual position and which device renders inoperative the sensing means and enables a manual adjustment of the diaphragm to be effected.

The selector device, in the illustrated embodiment of the invention, comprises a rotatable ring 26 which is concentric with the optical axis, and which is fixedly connected to an outer or accessible actuating and diaphragm setting ring 27 having a knurled periphery 27a for convenience of actuation. For setting purposes, the ring 27 has a setting or index mark 28 identified with the word "auto" as well as a diaphragm scale 29 which is associated with the word "hand." The index mark 28 and the scale 29 are cooperable with a fixed index mark 30 provided on the camera case 1.

The operation of rendering inoperative the automatic diaphragm setting device in response to actuation of the selector means 26, 27 when the latter is placed in the "hand" position, is accomplished, as shown in the illustrated embodiment of the invention, in an extremely simple manner by merely retaining the setting device and more especially the powered sensing member 6 in its starting position. For this purpose, the slide 19 has a pin 31, which, when the members 26, 27 are placed in the "auto" position, is receivable in a recess or notch 26a provided on the periphery of the ring 26 (FIG. 2). However, when the rings 26, 27 are in the manual or "hand" position wherein the scale 29 is associated with the index mark 30, the recess 26a is removed from the vicinity of the pin 31 and the latter is restrained by engagement with the outer edge or periphery of the ring 26, thereby preventing left-to-right sliding movement of the slide 19 and preventing the spring 13 from shifting the powered sensing member 6 downward from its raised starting position.

For the purpose of actuating the diaphragm when the members 26, 27 are set for manual diaphragm adjustment, a cam 26b is provided on the ring 26, and the diaphragm sectors 8 are coupled to the cam 26b by a positive unidirectional driving connection of the tensional type involving a spring action. Such connection is established, without additional cost, by means of the aforementioned two-armed lever 17 which for this purpose is provided with a pin 320 arranged for engagement with the cam 26b under the action of the spring 12 which biases the diaphragm adjusting ring 11 clockwise.

The use of the cam 26b, constituted by one edge of a cam slot provided in the ring 26, makes it possible in a simple manner to obtain a greater extent of movement or adjustment for the diaphragm setting ring 27, as compared with the extent of movement or adjustment of the diaphragm actuating ring 11. This provides the advantage that the graduations on the diaphragm scale 29 may be separated from each other by an appreciable distance, whereby they are readily readable, thereby insuring an accurate manual setting of the diaphragm.

The correct method of operating the camera when utilizing the automatic diaphragm setting mechanism involves adjusting the diaphragm aperture by means of the powered sensing member 6 in conjunction with the deflection member 15 of the exposure meter measuring device in such a manner that the diaphragm aperture remains unchanged and independent of the speed for which the shutter is set, at least until the exposure has been completed and the shutter again closes.

This is accomplished by the present invention in a simple and reliable manner by the provision of a locking device, by means of which the shutter release member 5 is retained in its released position after having been initially actuated until the camera shutter completes the exposure and again closes.

FIG. 5 shows such a locking device as provided in the illustrated embodiment of the invention. It comprises a locking member 32 having a slot type guide 32a accommodating pins 33 by which the member is shiftable horizontally in a plane which is perpendicular to the optical axis. The member 32 is also shiftable in a direction perpendicular to the axis of the shutter release member 5. For cooperation with the release member 5, the locking slide 32 has a detent lug 32b arranged to engage a collar 5b provided on the member 5 under the action of a spring 34 which is described in detail below. In FIG. 5, the shutter release 5 is shown in its actuated or releasing position, wherein the collar 5b is engaged and locked by the slide 32, preventing the shutter release 5 from returning to its starting position as shown in FIGS. 1 and 2. As is apparent from FIG. 5, the collar 5b of the shutter release is of conical configuration, thereby enabling it to bypass the slide 32 when the release member 5 is shifted downward against the action of the release return spring 7.

The locking device 5b, 32 for the shutter release 5 is rendered inoperative, in accordance with the invention, automatically by means of a member constituting part of the shutter drive mechanism.

For this purpose, as shown in the illustrated embodiment of the invention, the driving disc 35 of the shutter drive mechanism is utilized. This disc is shown in its loaded or cocked position in FIG. 5. The disc 35 has a projection 35a, by means of which it swivels, at the end of the clockwise running off movement of the disc, a bell crank 37 pivotally mounted about a stationary pin 36 in the shutter compartment. Connected to the bell crank 37 is a member 38 which is shiftably mounted by means of a pin-and-slot mounting 38a, 39 on the camera. A two-armed lever 41 is pivotally mounted on the camera by means of a fixed pivot pin 40, and serves to connect the slide 38 with the locking member 32. One end of the spring 34 above mentioned is secured to a pin 42 carried by the slide 38, whereas the other end of the spring 34 is affixed to stop or anchorage 43 provided in the camera. The spring 34 tends to maintain the locking device in the locking position shown in FIG. 5.

The above-described arrangement insures the effecting of the exposure with the diaphragm aperture adusted and retained in its adjusted position in accordance with the prevailing light and photographic conditions independently of the speed for which the shutter is set, and more especially, regardless of whether the photograph is being taken with or without the use of a delayed action device.

The driving mechanism of the shutter, which includes the driving disc 35 shown in FIG. 5, is well known per se and has therefore not been shown in detail for the sake of clarity of illustration.

What is claimed is:

1. In a photographic camera of the type having automatic diaphragm setting means, in combination, a movable deflection member of an electric exposure meter, the position of said deflection member being indicative of the intensity of the existing light conditions; sensing means including a powered movable member having a predeterminate extent of movement, said means being cooperable with said deflection member and effecting an adustable positioning of said powered member as determined by the deflected position of the deflection member; a diaphragm adjustment mechanism including a diaphragm adjusting member having an extent of movement substantially equal to said predeterminate extent; coupling means, coupling the diaphragm adjusting member with said powered member for actuation thereby; a selector means settable between "automatic" position and "manual" position, and said coupling means including a two-armed lever and an associated slide means operatively connected between said lever and said powered movable member, said lever being fulcrumed to said selector means and having one arm thereof connected to said diaphragm adjusting member and having its other arm operatively associated with said slide in the "automatic" position of said selector means, control means associated with said selector means operative to effect actuation of said lever so as to effect adjustment of said diaphragm adjusting member when said selector means is set to its "manual" position; a camera release; means rendering operative said sensing means in the "automatic" position of said selector means in response to actuating of the camera release; a stationary means constituting part of the diaphragm adjustment mechanism; and a segmental diaphragm having shutter blade-like diaphragm segments drivingly pivotally connected with said diaphragm adjusting member and pivotally connected to said stationary means, providing an adjustable diaphragm aperture the size of which is regulated by said adjusting member.

2. In a photographic camera of the type having automatic diaphragm setting means, in combination, a movable deflection member of an electric exposure meter, the position of said deflection member being indicative of the intensity of the existing light conditions; sensing means including a powered movable member cooperable with said deflection member, effecting an adjustable positioning of said powered member as determined by the deflected position of the deflection member; a diaphragm adjusting member and coupling means coupling the same with said powered member for actuation thereby; a camera release; means rendering operative said sensing means in response to actuating of the camera release; a segmental diaphragm having shutter-blade-like diaphragm segments connected with said diaphragm adusting member, providing an adjustable diaphragm aperture the size of which is regulated by said adjusting member; and a releasable locking device for holding the camera release in its released position after having been actuated thereto, said locking device being released upon completion of the exposure by the camera shutter.

3. The invention as defined in claim 2, in which there is a member constituting part of the shutter drive mechanism, which effects release of the said locking device.

4. In a photographic camera of the type having automatic diaphragm setting means, in combination, a movable deflection member of an electric exposure meter, the position of said deflection member being indicative of the intensity of the existing light conditions; sensing means including a powered movable member cooperable with said deflection member, effecting an adjustable positioning of said powered member as determined by the deflected position of the deflection member; a diaphragm adjusting member and coupling means coupling the same with said powered member for actuation thereby; a camera release; means rendering operative said sensing means in response to actuating of the camera release; a segmental diaphragm having shutter-blade-like diaphragm segments connected with said diaphragm adjusting member, providing an adjustable diaphragm aperture the size of which is regulated by said adjusting member; and a selector means settable between "automatic" and "manual" positions, said selector means rendering inoperative said sensing means and effecting manual adjustment of the diaphragm when in its "manual" position, a cam connected with the selector means for effecting adustment of the diaphragm, means constituting a unidirectionally positive, tensional driving connection between the cam and diaphragm adjusting member, the diaphragm adjusting member and selector means each comprising rings which are concentric with the optical axis, the driving connection means including a two-armed lever, said lever constituting a part of the said coupling means which latter is operative when the selector means is in its "automatic" position.

5. A photographic camera comprising a diaphragm adjusting member having shutter blade-like diaphragm segments pivotally connected thereto to define an adjustable diaphragm aperture; a movable deflection member of an exposure meter the position of which being indicative of the intensity of the existing light conditions; sensing means cooperable with said deflection member for effecting adjustable positioning of said sensing means as determined by the deflected position of said deflection member, a selector means settable between "automatic" and "manual" positions, and means for rendering said diaphragm adjusting member responsive to the light intensity as indicated by the exposure meter when in the "automatic" setting of said selector means or responsive to manual operation in the "manual" setting of said selector means, said latter means including a fixedly positioned two-armed lever which is connected to the diaphragm adjusting member, said selector means including a control means, said control means operating on said lever for adjusting the position of said lever and connected diaphragm adjusting member in response to manual setting of said selector means and whereby in the "automatic" position of said selector means, the influence of said control means on said lever is discontinued, and means operatively connecting said lever to said sensing means whereby the adjusting motion of said lever and connected diaphragm adjusting member is brought about by said sensing member.

6. In a photographic camera, as defined in claim 5, wherein the selector means and the diaphragm actuating member are developed as rings arranged concentrically with the optical axis of the camera.

7. In a photographic camera, as defined in claim 5, wherein the control means comprises a uni-laterally acting cam guide formed on the selector means for influencing said lever.

8. A photographic camera, as defined in claim 5, and including a locking device for holding the camera release in its released position after having been actuated, and said locking device being released upon completion of the exposure by the camera shutter.

9. The invention as defined in claim 8, in which there is a member constituting part of the shutter drive mechanism which effects release of said locking device.

References Cited in the file of this patent

UNITED STATES PATENTS

| | | |
|---|---|---|
| 2,148,963 | Rauch | Feb. 28, 1939 |
| 2,887,025 | Rentschler | May 19, 1959 |
| 2,906,166 | Herterich | Sept. 29, 1959 |
| 2,913,969 | Faulhaber | Nov. 24, 1959 |
| 2,925,760 | Broschke | Feb. 23, 1960 |
| 2,969,004 | Gebele | Jan. 24, 1961 |
| 2,999,441 | Hutchison | Sept. 12, 1961 |